(12) United States Patent
Kobayashi et al.

(10) Patent No.: US 10,871,398 B2
(45) Date of Patent: Dec. 22, 2020

(54) GAS ANALYZER

(71) Applicant: YOKOGAWA ELECTRIC CORPORATION, Tokyo (JP)

(72) Inventors: Yoshitaka Kobayashi, Musashino (JP); Junichi Matsuo, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/385,870

(22) Filed: Apr. 16, 2019

(65) Prior Publication Data

US 2019/0316965 A1    Oct. 17, 2019

(30) Foreign Application Priority Data

Apr. 16, 2018   (JP) ................. 2018-078486

(51) Int. Cl.
*G01J 3/42* (2006.01)
*G01J 3/02* (2006.01)

(52) U.S. Cl.
CPC ............. *G01J 3/42* (2013.01); *G01J 3/021* (2013.01); *G01J 3/0208* (2013.01); *G01J 2003/421* (2013.01); *G01J 2003/423* (2013.01)

(58) Field of Classification Search
CPC ........... G01J 2003/421; G01J 2003/423; G01J 3/0208; G01J 3/021; G01J 3/42; G01N 2021/8521; G01N 2021/8578; G01N 21/3504; G01N 21/39; G01N 21/8507

See application file for complete search history.

(56) References Cited

U.S. PATENT DOCUMENTS

| | | | |
|---|---|---|---|
| 2013/0063729 A1 | 3/2013 | Iwai et al. | |
| 2014/0211209 A1* | 7/2014 | Ido | G01N 21/274 356/437 |

FOREIGN PATENT DOCUMENTS

| | | |
|---|---|---|
| EP | 3176564 A1 | 6/2017 |
| JP | H08-145883 A | 6/1996 |
| JP | H08297010 A | 11/1996 |
| JP | 2002231008 A * | 8/2002 |
| JP | 2010-185694 A | 8/2010 |
| JP | 2017-129594 A | 7/2017 |
| JP | 2017-142346 A | 8/2017 |
| JP | 2017-211357 A | 11/2017 |

\* cited by examiner

*Primary Examiner* — Chih-Cheng Kao
(74) *Attorney, Agent, or Firm* — Osha Bergman Watanabe & Burton LLP (57) ABSTRACT

A gas analyzer includes an optical emitter that irradiates measurement light into a measurement region including a gas to be measured; a reflector that reflects the measurement light irradiated from the optical emitter; an optical receiver that receives the measurement light reflected by the reflector; and an aligner that expands a beam diameter of the measurement light at the reflector.

6 Claims, 8 Drawing Sheets

FIG. 8

GAS ANALYZER

CROSS-REFERENCE TO RELATED APPLICATION

The present application claims priority to and the benefit of Japanese Patent Application No. 2018-078486 filed Apr. 16, 2018, the entire contents of which are incorporated herein by reference.

TECHNICAL FIELD

One or more embodiments of the present invention relate to a gas analyzer.

BACKGROUND

An apparatus for optically calculating the concentration of a gas to be measured flowing through a predetermined flow path is known, such as the gas concentration measurement apparatus disclosed in patent literature (PTL) 1.

CITATION LIST

Patent Literature

PTL 1: JP2010185694A

SUMMARY

A gas analyzer according to one or more embodiments includes an optical emitter configured to irradiate measurement light into a measurement region including a gas to be measured, a reflector configured to reflect the measurement light irradiated from the optical emitter, an optical receiver configured to receive the measurement light reflected by the reflector, and an alignment unit configured to expand a beam diameter of the measurement light at the reflector.

DETAILED DESCRIPTION

The gas concentration measurement apparatus disclosed in PTL 1 includes a reflecting mirror at the tip of a probe extending through the gas to be measured. The reflecting mirror reflects measurement light towards an optical receiver. In this case, if the probe vibrates and the position of the probe tip changes, for example, the amount of measurement light reflected by the reflecting mirror decreases depending on the position, and the amount of light received at the optical receiver decreases.

One or more embodiments of the present invention provide a gas analyzer that can ensure receipt at the optical receiver of the necessary amount of measurement light for concentration analysis, even in a vibrating environment.

A gas analyzer according to one or more embodiments includes an optical emitter that irradiates measurement light into a measurement region including a gas to be measured, a reflector that reflects the measurement light irradiated from the optical emitter, an optical receiver that receives the measurement light reflected by the reflector, and an aligner that expands a beam diameter of the measurement light at the reflector. This configuration can ensure receipt at the optical receiver of the necessary amount of measurement light for concentration analysis, even in a vibrating environment. Specifically, even when a probe including the reflector vibrates at the resonance point, the expansion of the measurement light causes the measurement light irradiated by the optical emitter to be incident on the reflector across the vibration range.

In a gas analyzer according to one or more embodiments, the aligner may expand the beam diameter of the measurement light to be greater than the width of the reflector in a direction substantially orthogonal to the optical axis of the measurement light. This configuration causes a portion of the measurement light to be incident on the reflector even if the position of the reflector at the resonance point is shifted in the up-down or front-back directions. The optical receiver can thus stably receive the measurement light reflected by the reflector.

In a gas analyzer according to one or more embodiments, the aligner may include an optical lens disposed between the optical emitter and the measurement region and may condense the measurement light. With this configuration, the beam diameter of the measurement light can be roughly adjusted towards a desired value. Variation in the gas concentration reading of the gas analyzer is therefore significantly reduced. Accordingly, the measurement tolerance with respect to displacement of the tip of the probe is improved.

In a gas analyzer according to one or more embodiments, the optical lens may be a plano-convex lens, a flat surface of the plano-convex lens may face the optical emitter, and a convex surface of the plano-convex lens may face the measurement region.

In a gas analyzer according to one or more embodiments, the aligner may further include an alignment mechanism that changes the distance between the optical lens and the optical emitter along the optical axis of the measurement light. With this configuration, the beam diameter of the measurement light can be minutely adjusted towards a desired value. Variation in the gas concentration reading of the gas analyzer is therefore further reduced. Accordingly, the measurement tolerance with respect to displacement of the tip of the probe is further improved.

In a gas analyzer according to one or more embodiments, the alignment mechanism may include an alignment screw rotatably supported about an axis substantially parallel to the optical axis by a fastener that fixes the optical lens, one end of the alignment screw may be in contact with the optical emitter, and another end of the alignment screw may be exposed from the fastener at an opposite side from the optical emitter.

A gas analyzer according to one or more embodiments may further include a probe extending along an optical axis of the measurement light so as to overlap the measurement region, and the reflector may be positioned at the opposite tip of the probe from the optical emitter. The gas analyzer can, for example, thereby be configured as a probe-type gas analyzer in which a light source, a reflecting structure, and a photodetector are integrally built into the gas analyzer.

One or more embodiments of the present invention may provide a gas analyzer that can ensure receipt at the optical receiver of the necessary amount of measurement light for concentration analysis, even in a vibrating environment.

Embodiments of the present invention are described below with reference to the drawings. The front-back, left-right, and up-down directions referred to below are based on the directions of the arrows in the drawings. The directions of the arrows are consistent in FIG. 1 through FIG. 4 and in FIG. 6 through FIG. 8.

An example in which a gas to be measured G flows upward from below in each drawing is described below. The flow direction of the gas to be measured G is not limited to this case. The gas to be measured G may flow in any direction, and a gas analyzer 1 according to one or more embodiments may be arranged in any direction in accordance with the flow direction of the gas to be measured G.

Figure 1:
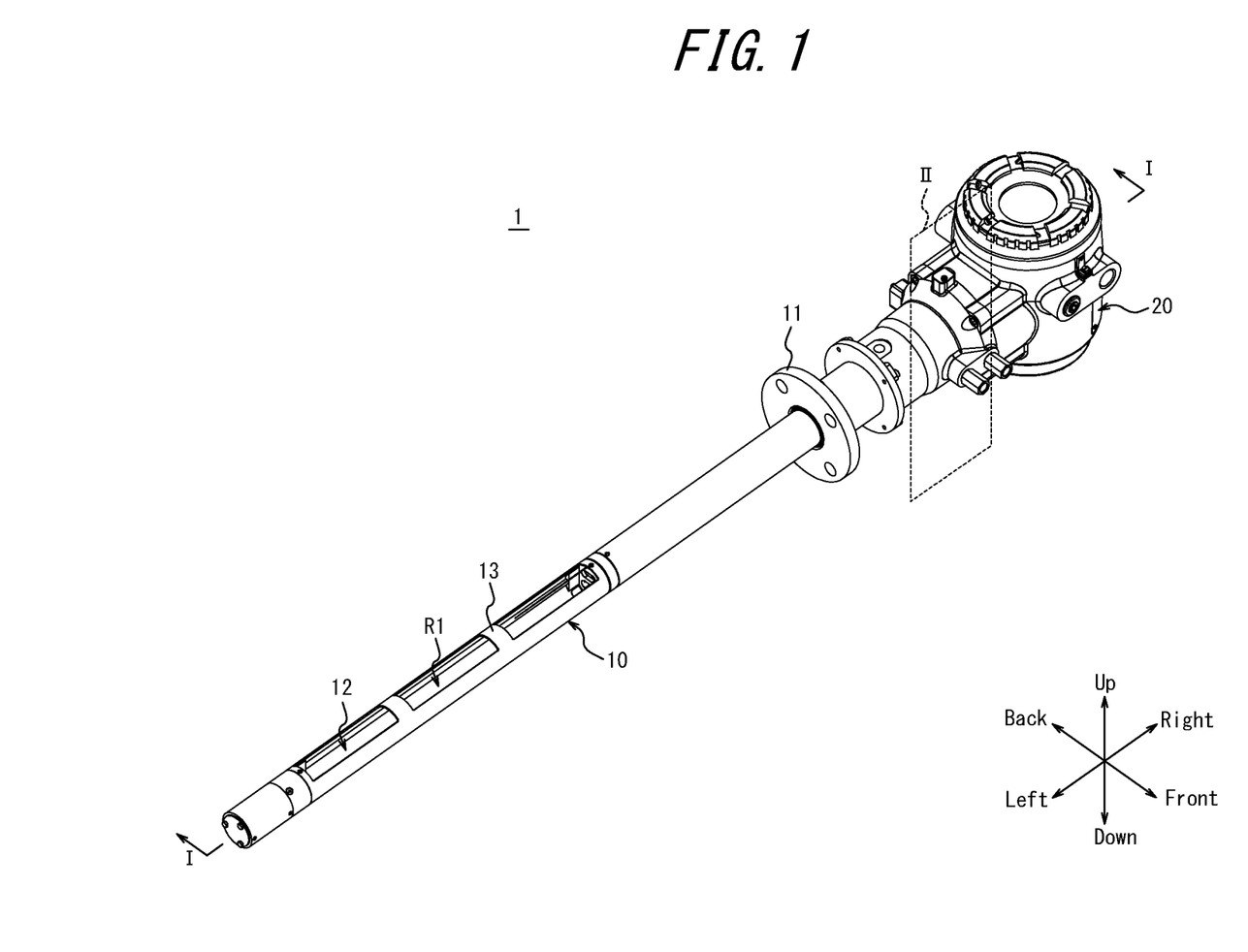
FIG. 1 is a perspective view from above illustrating a gas analyzer according to one or more embodiments.
Figure 2:
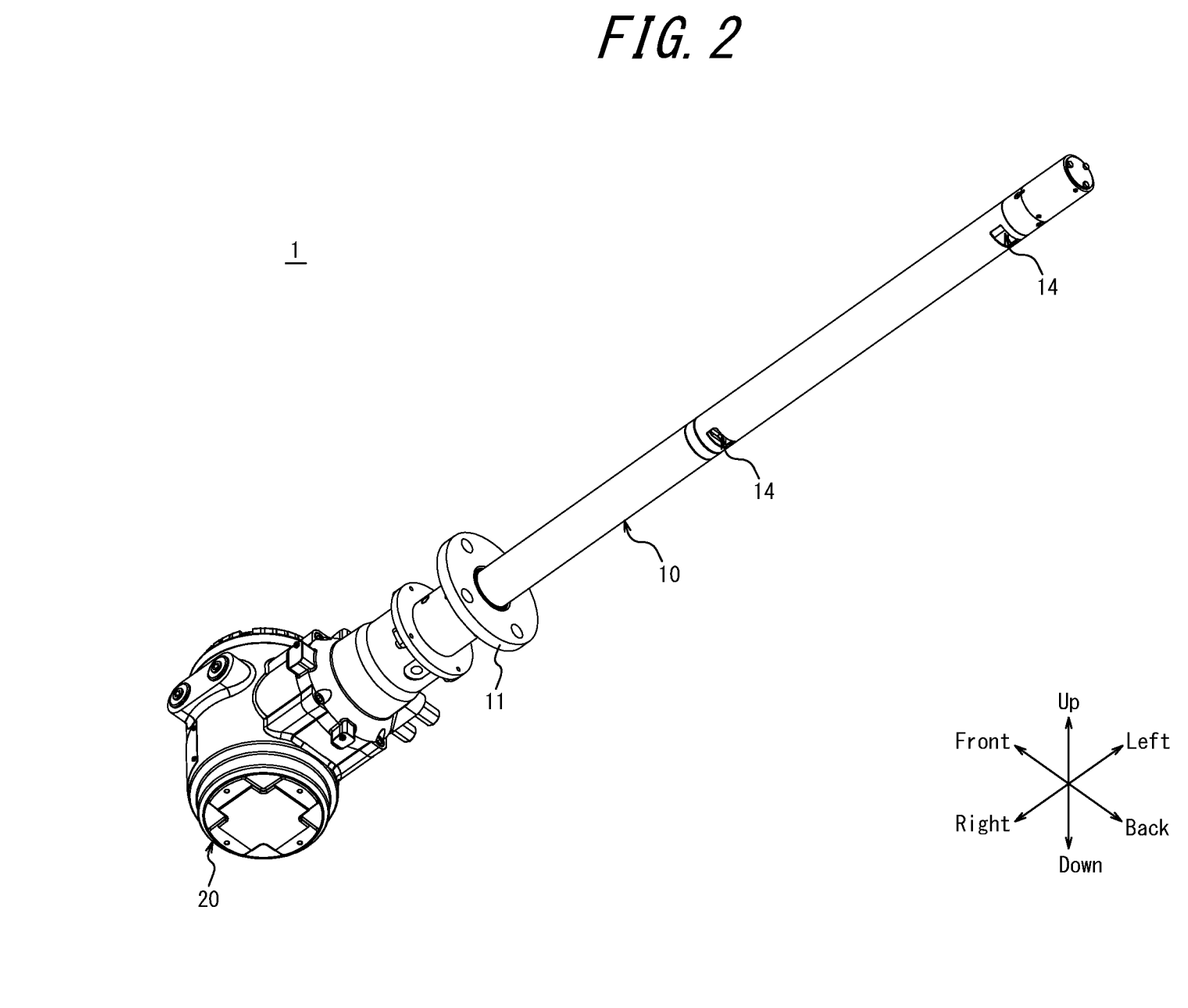
FIG. 2 is a perspective view from below illustrating the gas analyzer of FIG. 1 according to one or more embodiments.
Figure 3:
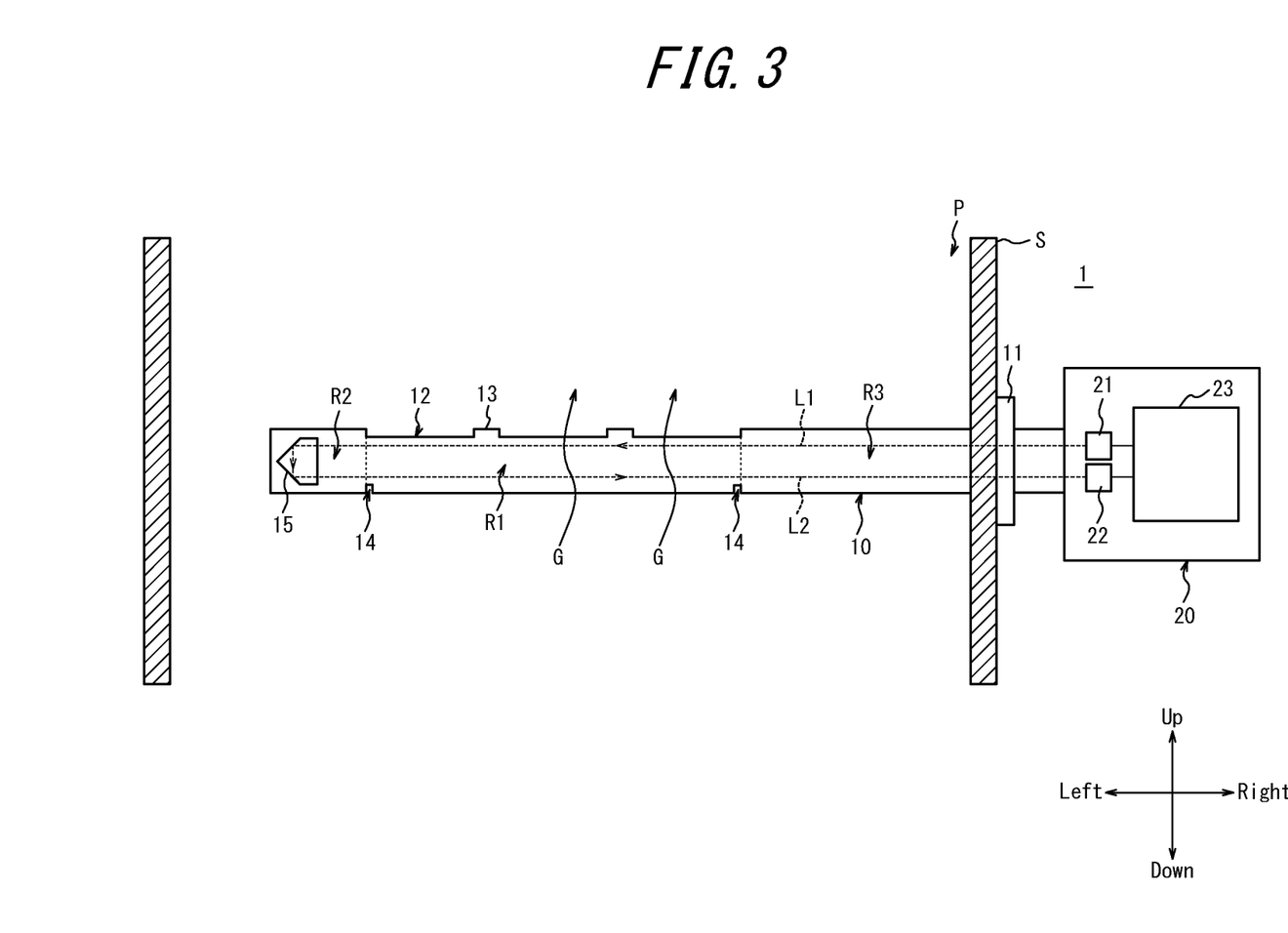
FIG. 3 is a schematic cross-section along the I-I arrows in FIG. 1 according to one or more embodiments.

FIG. 1 is a perspective view from above illustrating the gas analyzer 1 according to one or more embodiments. FIG. 2 is a perspective view from below illustrating the gas analyzer 1 of FIG. 1. FIG. 3 is a schematic cross-section along the I-I arrows in FIG. 1. As an example, FIG. 3 illustrates the gas analyzer 1 of FIG. 1 attached to a flue wall S to analyze the component concentration of a certain component included in the gas to be measured G that flows in a flue P. For the sake of explanation, the configuration of the gas analyzer 1 according to one or more embodiments is simplified in FIG. 3. Specifically, details of the internal configuration of the analysis unit 20, such as an aligner 24, a fastener 25, and a more detailed configuration of an optical emitter 21, described below, are omitted in FIG. 3.

The functions and configuration of the gas analyzer 1 according to one or more embodiments are mainly described with reference to FIGS. 1 to 3.

The gas analyzer 1 is, for example, attached directly to the flow path through which the gas to be measured G flows. The gas analyzer 1 analyzes the component concentration of a measurement target component. The gas to be measured G may, for example, include a gas such as CO, $CO_2$, $H_2O$, $C_nH_m$ (a hydrocarbon), $NH_3$, or $O_2$. The flow path includes piping, a flue, a combustion furnace, and the like.

The gas analyzer 1 includes a probe-type tunable diode laser absorption spectroscopy (TDLAS) gas analyzer, for example, that has an explosion-proof structure and is used in an explosion-proof area. Probe-type refers, for example, to how the gas analyzer 1 has a light source, a reflecting structure, and a photodetector integrally built therein and is structured for insertion from one end into the flow path through which the gas to be measured G flows. The gas analyzer 1 analyzes the component concentration of the measurement target component by irradiating a laser beam that becomes measurement light onto the gas to be measured G, which includes a process gas or the like, for example.

The gas molecules included in the gas to be measured G exhibit a light absorption spectrum based on the vibration and rotational energy transition of the molecules in a region from infrared to near infrared. The absorption spectrum is unique to the component molecules. By the Lambert-Beer law, the absorbance of gas molecules with regard to the measurement light is proportional to their component concentration and the optical path length. Accordingly, the component concentration of the measurement target component can be analyzed by measuring the absorption spectrum intensity.

In TDLAS, a semiconductor laser beam with a sufficiently narrower line width than the absorption line width of the energy transition of the gas molecules is irradiated onto the gas to be measured G as measurement light. The wavelength of measurement light is swept by high-speed modulation of the drive current for the semiconductor laser. The optical intensity of the measurement light that passes through the gas to be measured G is measured to acquire one independent absorption spectrum.

The sweep range of the laser beam differs depending on use. When the measurement target component is $O_2$, the line width of the laser light is, for example, 0.0002 nm, and the sweep width is, for example, 0.1 nm to 0.2 nm. The absorption spectrum is measured by sweeping over a sweep width of 0.1 nm to 0.2 nm. The component concentration of the measurement target component is calculated by performing concentration conversion on the acquired single absorption spectrum. Methods of concentration conversion include known methods, such as the peak height method, the spectral area method, and the 2f method.

The major components of the gas analyzer 1 are a probe 10 and an analysis unit 20. As illustrated in the example gas analyzer 1 of FIG. 3, the majority of the probe 10 extends inside the flue P, and the analysis unit 20 is supported while disposed on the outside of the flue P. Specifically, the gas analyzer 1 is supported by the flue wall S when a flange 11, formed on a portion of the probe 10, is attached to the flue wall S from the outside.

As illustrated in FIG. 1 and FIG. 2, the probe 10 is a cylindrical body with a substantially circular cross-sectional shape, for example. The external length from the outer surface of the flange 11 to the tip of the probe 10 is, for example, approximately 0.5 m to 2 m. The probe 10 is formed by any metal member. As illustrated in FIG. 3, the probe 10 extends in a substantially orthogonal direction to the flow direction of the gas to be measured G inside the flue P, for example.

The probe 10 extends in the left-right direction and includes an opening 12 that opens upward, as illustrated in FIG. 1. The opening 12 exposes the corresponding interior section of the probe 10 inside the flue P. The probe 10 includes a plurality of ribs 13 provided in the opening 12 to maintain the strength of the probe 10. As illustrated in FIG. 2, the probe 10 includes notches 14 formed by cutting out a portion of the surface of the probe 10 from below, towards the inside. The notches 14 are respectively formed at substantially the same left-right positions as the left-right ends of the opening 12. The notches 14 connect the inner section of the probe 10 exposed in the flue P by the opening 12 with the space in the flue P below the inner section.

As illustrated in FIG. 3, the probe 10 includes a reflector 15 in the inner section at the tip inside the flue P. The reflector 15 includes any reflecting structure for reflecting the measurement light, such as a corner cube prism or a retroreflector.

The analysis unit 20 is attached at the opposite end from the tip of the probe 10 where the reflector 15 is attached. The analysis unit 20 is located outside of the flue P. The analysis unit 20 includes the optical emitter 21 for irradiating the measurement light onto the gas to be measured G and an optical receiver 22 for receiving the measurement light reflected by the reflector 15. The analysis unit 20 further includes a calculation unit 23. The optical emitter 21, the optical receiver 22, and the calculation unit 23 are electrically connected via a plurality of electronic substrates. The housing of the analysis unit 20 is, for example, an explosion-proof container that stores each of these components. The analysis unit 20 has a module structure for integrally storing these components. The optical emitter 21 and the optical receiver 22 are arranged near each other inside the analysis unit 20.

The optical emitter 21 includes any light source capable of measurement by TDLAS with respect to the gas to be measured G. For example, the optical emitter 21 includes a semiconductor laser. The optical receiver 22 includes any photodetector capable of measurement by TDLAS with respect to the gas to be measured G. For example, the optical receiver 22 includes a photodiode. The calculation unit 23 includes one or more processors. The calculation unit 23 controls overall operations of the gas analyzer 1, including the optical emitter 21 and the optical receiver 22.

A portion of the gas to be measured G flowing upward from below in the flue P flows into a measurement region R1 inside the probe 10 from below through the notches 14. Another portion of the gas to be measured G wraps around and flows into the measurement region R1 inside the probe 10 through the opening 12 from above. In this way, the gas to be measured G flowing through the flue P flows inside the probe 10. The gas to be measured G flowing inside the probe 10 flows out into the flue P once again through the opening 12, for example. Here, the measurement region R1 includes an interior space of the probe 10 exposed to the flue P by the opening 12. In this way, the measurement region R1 is filled with the gas to be measured G.

On the other hand, a purge gas is supplied by any appropriate mechanism to regions R2 and R3 formed on the left and right sides of the measurement region R1 inside the probe 10. In FIG. 3, the boundary between the measurement region R1 and the region R2 and the boundary between the measurement region R1 and the region R3 are indicated by dotted lines. The purge gas suppresses contact between the gas to be measured G and optical components such as the reflector 15, the optical emitter 21, and the optical receiver 22 to prevent problems, such as contamination or corrosion, of these optical components. The regions R2 and R3 are thus filled with the purge gas.

The notches 14 suppress mixing of the gas to be measured G and the purge gas between the measurement region R1 and the regions R2 and R3. Specifically, the notches 14 guide the gas to be measured G from the flue P into the measurement region R1 in the probe 10, thereby suppressing mixing of the purge gas into the measurement region R1. Similarly, the notches 14 suppress mixing of the gas to be measured G into the regions R2 and R3.

The optical emitter 21 irradiates measurement light towards the reflector 15 of the probe 10. In FIG. 3, the measurement light before being reflected by the reflector 15 is indicated as emitted light L1. The optical emitter 21 irradiates the emitted light L1 into the measurement region R1 that includes the gas to be measured G. The emitted light L1 propagates inside the probe 10, which extends along the optical axis of the emitted light L1 so as to overlap the measurement region R1. The emitted light L1 is then incident on the reflector 15. The reflector 15 is positioned at the opposite tip of the probe 10 from the optical emitter 21 and reflects a portion of the emitted light L1 that passed through the measurement region R1. In FIG. 3, the measurement light after being reflected by the reflector 15 is indicated as reflected light L2. The reflected light L2 again passes through the inside of the probe 10 that includes the measurement region R1. The optical receiver 22 receives the reflected light L2 that was reflected by the reflector 15 and passed through the measurement region R1. In this manner, the measurement region R1 is arranged between the optical emitter 21 and the optical receiver 22 in the optical path of the emitted light L1 and the reflected light L2.

The optical receiver 22 electrically amplifies a measurement signal related to the detected measurement light using any appropriate amplifier circuit and outputs the detected optical intensity of the measurement light to the calculation unit 23 as a scan signal. A portion of each of the emitted light L1 and the reflected light L2 is absorbed, when passing through the inside of the probe 10, by the gas to be measured G flowing in the measurement region R1. The component concentration of the measurement target component in the gas to be measured G is calculated by measuring the absorption spectrum on the basis of the measurement signal acquired by the optical receiver 22.

In the above-described probe-type gas analyzer 1, each of the optical emitter 21, the reflector 15, and the optical receiver 22 need to satisfy predetermined conditions in a state of attachment at the installation site. The predetermined conditions include positional relationships between these optical components such that the emitted light L1 irradiated from the optical emitter 21 passes through the measurement region R1 and is reflected by the reflector 15, and the reflected light L2 passes back through the measurement region R1 and is incident on the optical receiver 22.

Figure 4:
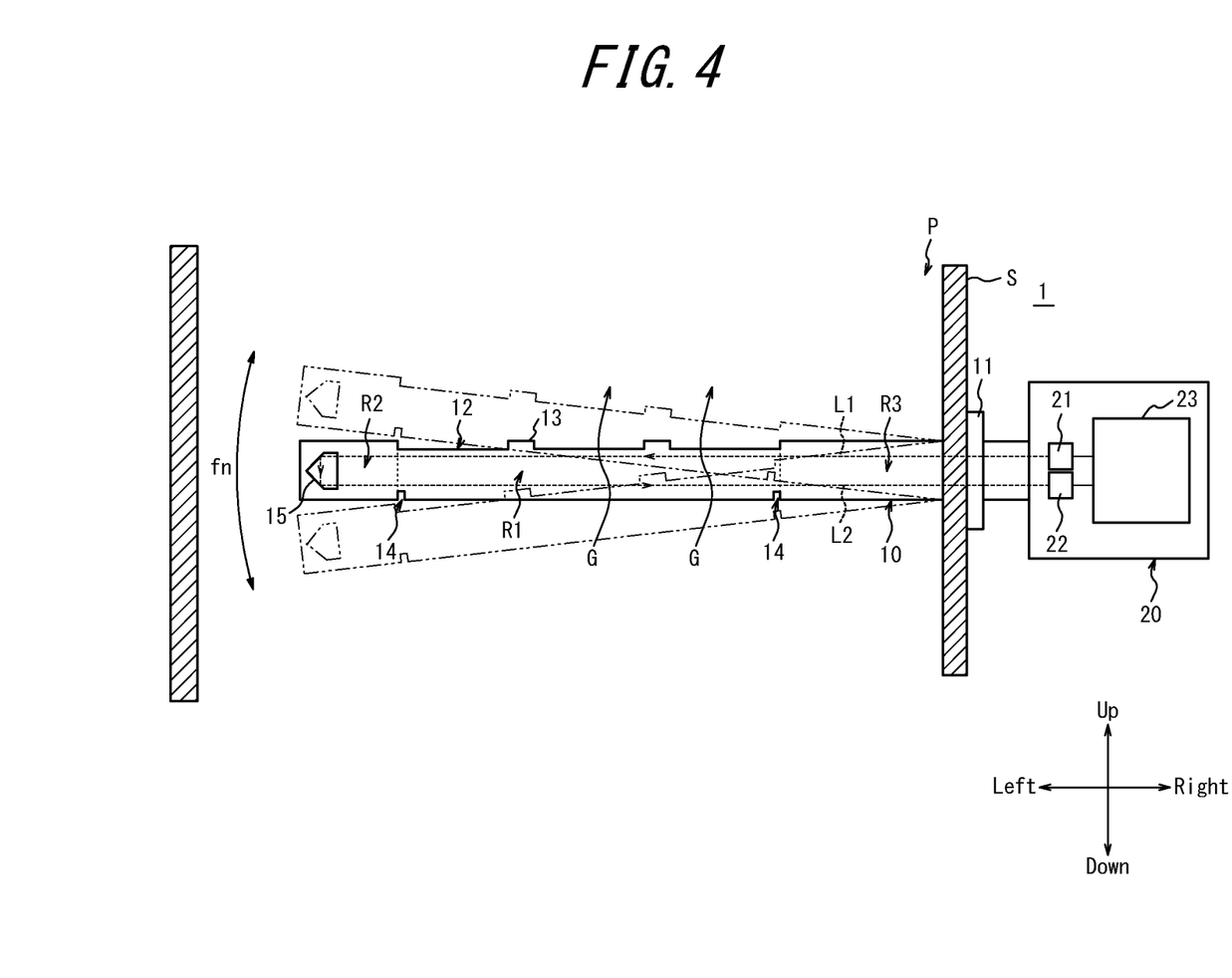
FIG. 4 is a schematic diagram that corresponds to FIG. 3 and illustrates the behavior of the probe in a vibrating environment according to one or more embodiments.
Figure 5:
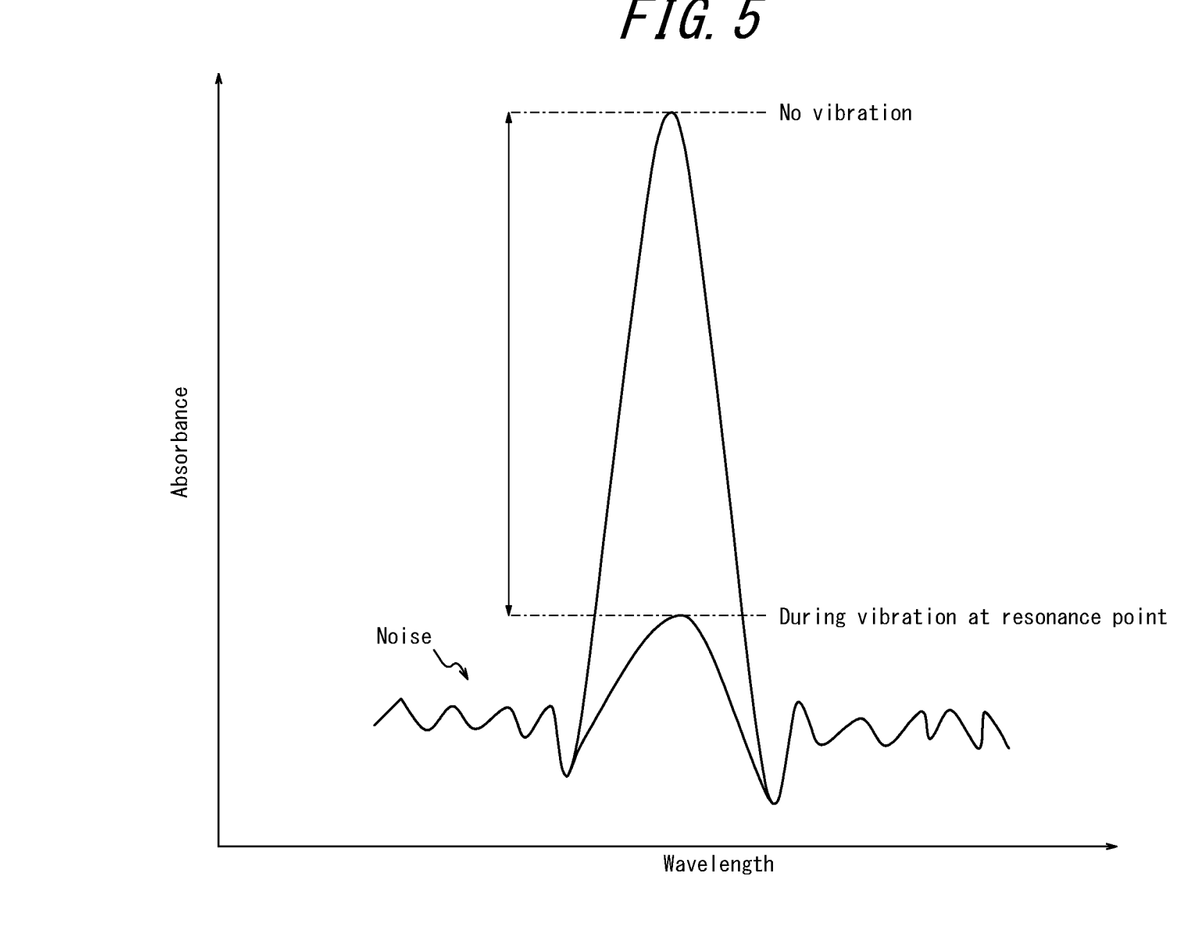
FIG. 5 is a schematic diagram illustrating a scan signal outputted by an optical receiver according to one or more embodiments.

FIG. 4 is a schematic diagram that corresponds to FIG. 3 and illustrates the behavior of the probe 10 in a vibrating environment. FIG. 5 is a schematic diagram illustrating a scan signal outputted by the optical receiver 22. With reference to FIGS. 4 and 5, an example in which the gas analyzer 1 is installed on the flue wall S in a vibrating environment is considered.

Steady vibrations or vibrations due to temporary disturbances may occur, depending on the environment in which the probe-type gas analyzer 1 is installed. The gas analyzer 1 is affected by the vibrations in this case. For example, the flue wall S to which the gas analyzer 1 is attached may vibrate under the influence of another device that includes a motor, a fan, and the like near the flue P. In the case of ordinary vibrations, the gas analyzer 1 simply vibrates together with the flue wall S, and measurement is hardly affected. When the frequency of vibration of the flue wall S substantially matches the natural frequency (resonance point) fn of the gas analyzer 1, however, the probe 10 resonates with the flue wall S as a fixed end and ends up vibrating violently, as indicated by the dashed double-dotted lines in FIG. 4. Here, stating that "the frequency of vibration of the flue wall S substantially matches the natural frequency fn of the gas analyzer 1" includes, for example, the cases of the frequencies being identical or being within a range of ±0.1 Hz of each other.

The amplitude of the tip of the probe 10 is approximately 100 mm, for example, when the length of the probe 10 (specifically, the external length from the outer surface of the flange 11 to the tip of the probe 10) is 2 m, and the acceleration during vibration is 1.4 m/s². Accordingly, when the measurement light irradiated from the optical emitter 21 is parallel light with a beam diameter φ of approximately 3 mm to 4 mm, the majority of the measurement light is no longer incident on the reflector 15, depending on the position of the reflector 15. The optical intensity of the measurement light that returns to the optical receiver 22 is thereby greatly reduced. Consequently, it becomes difficult to acquire a scan signal having the strength necessary for analysis. Moreover, the amount of light received at the optical receiver 22 decreases. As illustrated in FIG. 5, the proportion of noise relative to the scan signal is therefore increased, and along with the scan signal, the noise also ends up being amplified by the amplifier circuit. In this way, the proportion of noise included in the scan signal increases due to vibration of the probe 10 depending on the position of the reflector 15. This makes the gas concentration reading of the gas analyzer 1 vary greatly over time and makes stable analysis difficult.

The gas analyzer 1 according to one or more embodiments is configured so that even when the probe 10 vibrates as described above, and the frequency of the vibration substantially matches the resonance point, for example, the measurement light irradiated by the optical emitter 21 is reflected by the reflector 15 and returns to the optical receiver 22 with sufficient optical intensity across the vibration range. As a result, the gas analyzer 1 achieves a stable gas concentration reading with respect to the component concentration of the measurement target component in the gas to be measured G.

Figure 6:
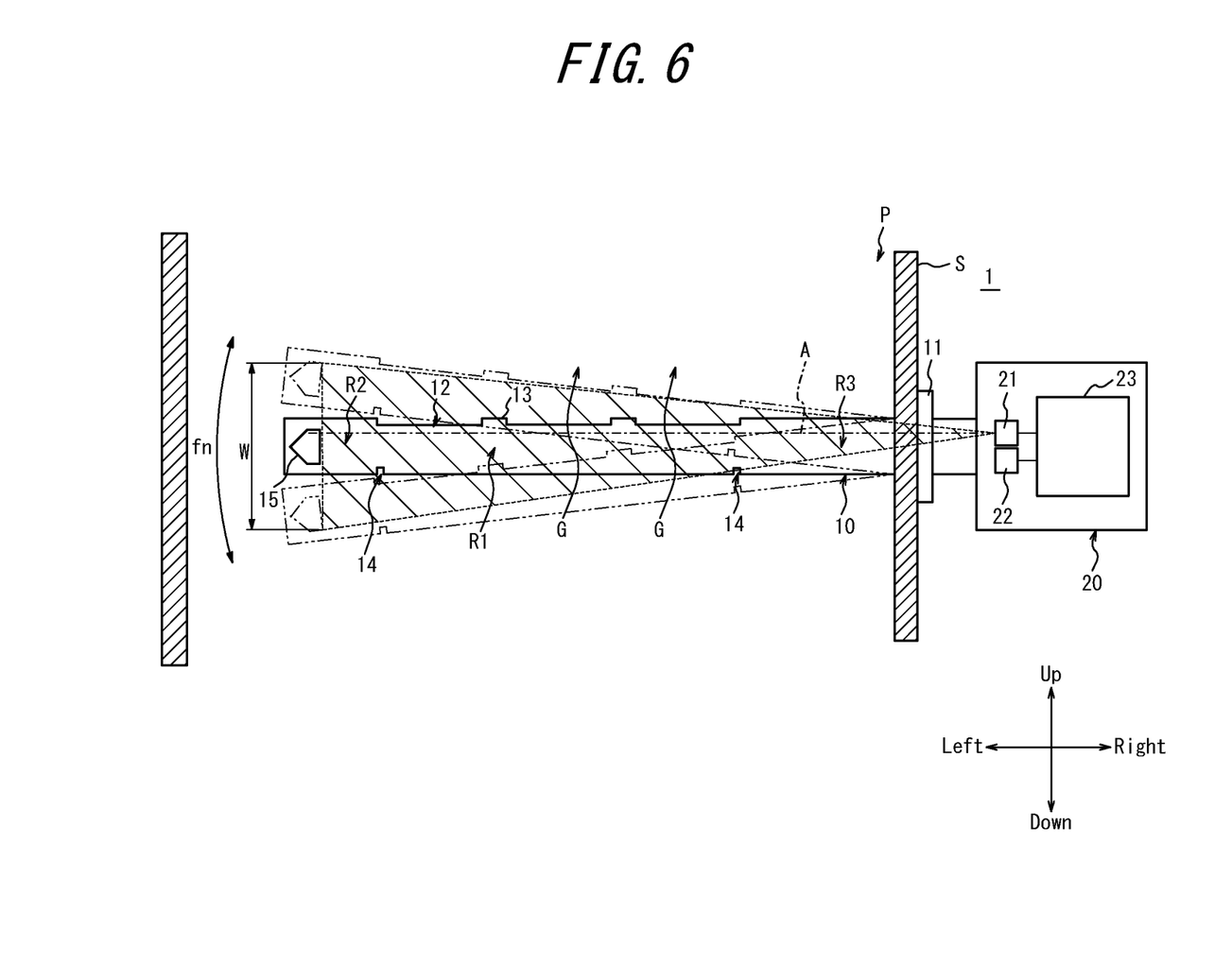
FIG. 6 is a schematic diagram that corresponds to FIG. 3 and illustrates measurement light irradiated from an optical emitter according to one or more embodiments.
Figure 7:
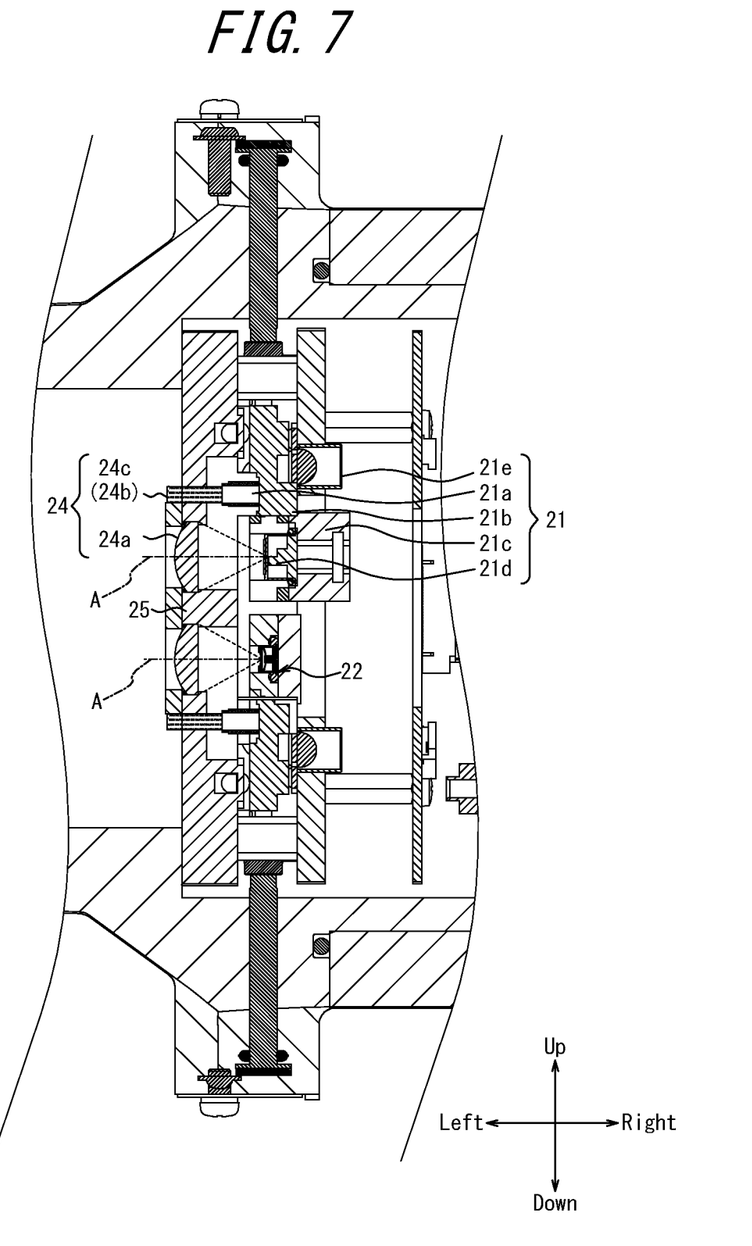
FIG. 7 is an enlarged cross-section illustrating an enlargement of the II portion in a cross-section along the I-I arrows in FIG. 1 according to one or more embodiments.
Figure 8:
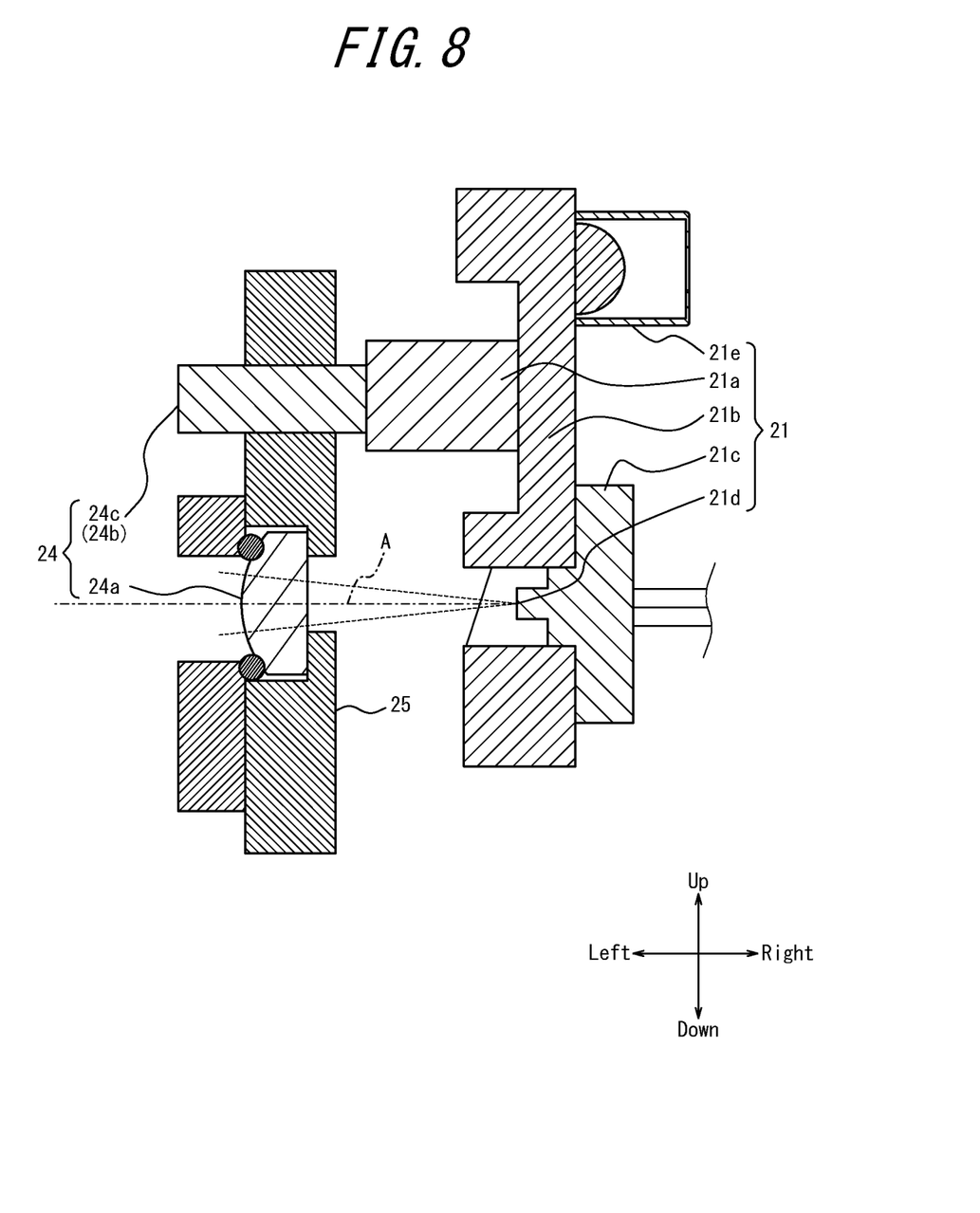
FIG. 8 schematically illustrates a portion of the components of FIG. 7 according to one or more embodiments.

FIG. 6 is a schematic diagram that corresponds to FIG. 3 and illustrates measurement light irradiated from the optical emitter 21. FIG. 7 is an enlarged cross-section illustrating an enlargement of the II portion in a cross-section along the I-I arrows in FIG. 1. FIG. 8 schematically illustrates a portion of the components of FIG. 7. As illustrated in FIGS. 7 and 8, the gas analyzer 1 includes an aligner 24 inside the analysis unit 20. The aligner 24 adjusts the beam diameter W of the measurement light at the incident end face of the reflector 15 in the probe 10. With reference to FIG. 6 through FIG. 8, the configuration of the optical emitter 21 is described in detail, and the configuration and function of the aligner 24 in the gas analyzer 1 according to one or more embodiments for achieving stable gas concentration readings are described below.

As illustrated in FIG. 7 and FIG. 8, the optical emitter 21 disposed inside the analysis unit 20 includes a piezoelectric element 21a. The piezoelectric element 21a imparts vibration with a phase differing by 180°, for example, to control optical noise occurring between the light source and an optical lens 24a. The optical emitter 21 includes a laser arm 21b that contacts one surface of the piezoelectric element 21a. The optical emitter 21 includes a laser holder 21c attached to the laser arm 21b. The optical emitter 21 includes a light-emitting element 21d supported by the tip of the laser holder 21c. The light-emitting element 21d includes a semiconductor laser element, for example. The optical emitter 21 includes a plunger 21e that pushes the laser arm 21b to the left.

The aligner 24 includes an optical lens 24a, disposed between the optical emitter 21 and the probe 10, that acts on the measurement light. The optical lens 24a is configured to condense the measurement light. The optical lens 24a is, for example, a plano-convex lens. The optical lens 24a is fixed by a fastener 25 so that the flat surface of the plano-convex lens faces the optical emitter 21 and the convex surface faces the probe 10. The optical lens 24a is made of a material exhibiting good wavelength properties with respect to the wavelength of the measurement light from the optical emitter 21. For example, the optical lens 24a is made of material with a transmittance of substantially 100% relative to the wavelength of the measurement light. The optical lens 24a has a focal length such that the beam diameter W of the measurement light at the incident end face of the reflector 15 in the probe 10 is adjusted roughly to a desired value.

The aligner 24 further includes an alignment mechanism 24b that changes the distance between the optical lens 24a and the optical emitter 21 along the optical axis A of the measurement light. In greater detail, the alignment mechanism 24b includes an alignment screw 24c rotatably supported about an axis substantially parallel to the optical axis A by the fastener 25 that fixes the optical lens 24a. The alignment screw 24c includes a narrow-pitch screw capable of minute alignments to the distance between the optical lens 24a and the optical emitter 21. For example, the alignment screw 24c includes a screw formed to have a 0.2 mm pitch. One end of the alignment screw 24c is in contact with the piezoelectric element 21a of the optical emitter 21, and the other end is exposed from the fastener 25 at the opposite side from the optical emitter 21.

In addition to making a rough alignment to the beam diameter W with the optical lens 24a, the aligner 24 is capable of minute alignments to the beam diameter W by changing the distance between the light-emitting element 21d and the optical lens 24a inside the optical emitter 21. For example, the laser arm 21b and the laser holder 21c move along the optical axis A via the piezoelectric element 21a by the alignment screw 24c rotating about an axis substantially parallel to the optical axis A. Consequently, the light-emitting element 21d also moves along the optical axis A. The optical lens 24a, on the other hand, is fixed by the fastener 25, so that the position of the optical lens 24a along the optical axis A does not change. The origin of the measurement light is adjusted by the optical lens 24a being fixed and the light-emitting element 21d being moved. The accuracy of alignment of the beam diameter W therefore improves, making alignment easy.

In greater detail, the alignment screw 24c pushes the piezoelectric element 21a to the right when tightened. At this time, the light-emitting element 21d moves away from the optical lens 24a, and the distance between the light-emitting element 21d and the optical lens 24a increases. The beam diameter W decreases in this case. When the alignment screw 24c is loosened, the flange 21e pushes the laser arm 21b to the left. At this time, the light-emitting element 21d moves closer to the optical lens 24a, and the distance between the light-emitting element 21d and the optical lens 24a decreases. The beam diameter W increases in this case.

The aligner 24 expands the beam diameter W of the measurement light at the reflector 15. Specifically, the aligner 24 expands the beam diameter W of the measurement light to be greater at the reflector 15 than the beam diameter when the measurement light is parallel light. For example, the aligner 24 expands the beam diameter W of the measurement light so that the measurement light is included at both of the ends of the reflector 15 in a direction substantially perpendicular to the optical axis A. In other words, the aligner 24 expands the beam diameter W of the measurement light to be greater than the width of the reflector 15 in a direction substantially perpendicular to the optical axis A. For example, the aligner 24 expands the beam diameter W of the measurement light so that the measurement light includes the positions of the reflector 15 at both ends of the vibration of the tip of the probe 10 in a direction substantially perpendicular to the optical axis A of the measurement light.

Here, directions substantially perpendicular to the optical axis A include the up-down direction, a direction approximating the up-down direction, the front-back direction, and a direction approximating the front-back direction. As illustrated in FIG. 6, the optical axis A of the measurement light is, for example, substantially parallel to the left-right direction. The tip of the probe 10 moves in the up-down direction, for example. The aligner 24 increases the beam diameter W of the measurement light at the incident end face of the reflector 15 in the probe 10 so that the measurement light includes the positions of the reflector 15 at the upper and lower ends of vibration of the tip of the probe 10. In greater detail, the aligner 24 adjusts the beam diameter W so that when the probe 10 is not vibrating, for example, the measurement light is sufficiently wider than when the measurement light is parallel light. When the external length from the outer surface of the flange 11 to the tip of the probe 10 is 2 m, for example, the aligner 24 adjusts the beam diameter W of the measurement light to expand from a beam diameter $\phi$ of approximately 3 mm to 4 mm for parallel light to a beam diameter $\phi$ of approximately 20 mm to 120 mm at a position 4 m away. The 4 m position prescribed here corresponds, for example, to the optical path length of measurement light that is emitted from the optical emitter 21 and returns to the optical receiver 22 when the external length from the outer surface of the flange 11 to the tip of the probe 10 is 2 m.

The distance between the light-emitting element 21d and the optical lens 24a needs to be decreased to increase the beam diameter W of the measurement light at the incident end face of the reflector 15 in the probe 10. An example method of adjusting the beam diameter W of the measurement light is described below.

In the first step, the value of the beam diameter W after the measurement light is enlarged is determined in advance by any appropriate method, including calculation and experimentation, on the basis of the length of the probe 10 and the amount of measurement light that the optical receiver 22 needs to receive for analysis.

In the second step, the alignment width over which the position of the light-emitting element 21d can be adjusted along the optical axis A relative to the fixed position of the optical lens 24a at the time of manufacturing the gas analyzer 1, for example, is determined.

In the third step, an optical lens 24a that allows the light-emitting element 21d to be adjusted within the aforementioned alignment width to the optimal position and that yields a beam diameter W approximating the value of the beam diameter W determined in the first step is selected.

In the fourth step, the alignment screw 24c is minutely adjusted so that the actual beam diameter W matches the value of the beam diameter W determined in the first step. The distance between the selected optical lens 24a and the light-emitting element 21d is thus determined.

The alignment screw 24c is, in principle, fixed after thus being adjusted once during initial settings in the manufacturing process of the gas analyzer 1.

The gas analyzer 1 according to one or more of the above embodiments may ensure receipt by the optical receiver 22 of the necessary amount of measurement light for concentration analysis, even in a vibrating environment. In greater detail, even when the probe 10 vibrates at the resonance point, the expansion of the measurement light causes the measurement light irradiated by the optical emitter 21 to be incident on the reflector 15 across the vibration range. The aligner 24 specifically expands the beam diameter W of the measurement light to be greater than the width of the reflector 15, so that even if the position of the reflector 15 at the resonance point is shifted in the up-down or front-back directions, a portion of the measurement light is incident on the reflector 15. Consequently, the optical receiver 22 can stably receive the measurement light reflected by the reflector 15.

Normally, to increase the amount of measurement light received by the optical receiver 22, the gas analyzer 1 is configured for the beam diameter W of the measurement light to be narrower than the width of the reflector 15, so that substantially all of the measurement light is reflected by the reflector 15. The amount of measurement light received by the optical receiver 22 decreases as the beam diameter W of the measurement light is expanded. Even if only a portion of the measurement light returns, however, the measurement signal can be amplified by an amplifier circuit to allow analysis of the component concentration of the measurement target component. Accordingly, when the tip of the probe 10 is vibrating, the variation in the gas concentration reading of the gas analyzer 1 is significantly reduced as compared to when the measurement light is parallel light. Increasing the beam diameter W of the measurement light thus improves the measurement tolerance with respect to displacement of the tip of the probe 10.

Since the aligner 24 includes the optical lens 24a that condenses the measurement light, the beam diameter W of the measurement light can be roughly adjusted towards a desired value. Variation in the gas concentration reading of the gas analyzer 1 is therefore significantly reduced. Accordingly, the measurement tolerance with respect to displacement of the tip of the probe 10 is improved.

Since the aligner 24 further includes the alignment mechanism 24b that changes the distance between the optical lens 24a and the optical emitter 21 along the optical axis A of the measurement light, the beam diameter W of the measurement light can be minutely adjusted towards a desired value. Variation in the gas concentration reading of the gas analyzer 1 is therefore further reduced. Accordingly, the measurement tolerance with respect to displacement of the tip of the probe 10 is further improved.

It will be clear to a person of ordinary skill in the art that the present invention may be implemented in certain ways other than the above embodiments without departing from the spirit or essential features thereof. Accordingly, the above explanation merely provides examples that are in no way limiting. The scope of the present invention is to be defined by the appended claims, not by the above explanation. Among all changes, various changes that are within the range of equivalents are considered to be included therein.

For example, the shape, arrangement, orientation, number, and the like of the above-described components are not limited to the above explanation or the drawings. The shape, arrangement, orientation, number, and the like of each component may be selected freely as long as the functions of the component can be achieved.

The gas analyzer 1 according to one or more embodiments may include any component other than the above-described components. For example, the gas analyzer 1 may further include a beam splitter that splits off a portion of the measurement light as reference light immediately after emission by the optical emitter 21. For example, the gas analyzer 1 may further include a reference cell that has therein a gas identical to the measurement target component in the gas to be measured G. The reference cell includes a photodetector that receives the reference light after the reference light passes through a region in which the gas is included. The photodetector outputs a TDLAS signal with respect to the gas, contained at a known concentration, that is identical to the measurement target component. When including such a reference cell, the gas analyzer 1 according to one or more of the above-described embodiments can also stabilize the amount of reference light received at the photodetector inside the reference cell. In greater detail, the amount of reference light received at the photodetector is stable even if the position of the photodetector varies due to vibration of the gas analyzer 1, for example, since the increase in beam diameter of the measurement light due to the aligner 24 also increases the beam diameter of the reference light.

The optical lens 24a is not limited to being a plano-convex lens. The optical lens 24a may be any lens capable of increasing the beam diameter W of the measurement light at the incident end face of the reflector 15 in the probe 10. For example, the optical lens 24a may be a biconvex lens or a concave lens. Also, the optical lens 24a may be an aspheric lens.

The alignment mechanism 24b has been described as changing the distance between the optical lens 24a and the optical emitter 21 along the optical axis A of the measurement light by the light-emitting element 21d moving with respect to the optical lens 24a. The alignment method is not, however, limited to this example. The distance between the optical lens 24a and the light-emitting element 21d may be adjusted by movement of at least one of these components.

The aligner 24 may be configured to include a plurality of optical lenses 24a, with different focal lengths, and to be capable of switching the optical lens 24a with any appropriate switching mechanism in order to roughly adjust the beam diameter W.

Both the emitted light L1 and the reflected light L2 have been described as passing through the measurement region R1, but this example is not limiting. Provided that the gas analyzer 1 is capable of analyzing the component concentration of the measurement target component in the gas to be measured G included in the measurement region R1, it suffices if only one of the emitted light L1 and the reflected light L2 passes through the measurement region R1.

The gas analyzer 1 has been described as being a probe-type device but is not limited to this type. The gas analyzer 1 may, for example, be configured so that the analysis unit 20 and the reflector 15 are separate bodies facing each other across the flue P. Specifically, any appropriate reflecting structure constituting the reflector 15 may be attached to the opposite side from the side of the flue wall S to which the analysis unit 20 is attached. In this case, the reflecting structure constituting the reflector 15 may, for example, be attached to the inner surface or the outer surface of the flue wall S.

When the analysis unit 20 and the reflector 15 in the gas analyzer 1 are configured as separate bodies facing each other across the flue P, the gas concentration reading may vary greatly over time due to vibration if the measurement light irradiated from the optical emitter 21 is parallel light. Vibration of the flue wall S may, for example, cause at least one of the relative positions of the reflector 15 and the optical emitter 21 and the relative positions of the reflector 15 and the optical receiver 22 to change, significantly reducing the optical intensity of the measurement light that returns to the optical receiver 22. Consequently, it becomes difficult to acquire a scan signal having the strength necessary for analysis.

The gas analyzer 1 according to one or more embodiments can ensure receipt by the optical receiver 22 of the necessary amount of measurement light for concentration analysis even in this case, just as when the gas analyzer 1 is a probe-type device. Specifically, even if the relative positions of the reflector 15 and the optical emitter 21 change, the expansion of the measurement light causes the measurement light irradiated by the optical emitter 21 to be incident on the reflector 15. Moreover, even if the relative positions of the reflector 15 and the optical receiver 22 change, the measurement light reflected by the reflector 15 is incident on the optical receiver 22. The optical receiver 22 can thus stably receive the measurement light reflected by the reflector 15.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A gas analyzer comprising:
an optical emitter that irradiates measurement light into a measurement region including a gas to be measured;
a probe that extends along an optical axis of the measurement light so as to overlap the measurement region inside the probe;
a reflector that reflects the measurement light irradiated from the optical emitter and that is positioned at an opposite side of the probe from the optical emitter;
an optical receiver that receives the measurement light reflected by the reflector; and
an aligner that expands a beam diameter of the measurement light at the reflector to a value at which the measurement light includes the reflector, wherein the value is based on a length of the probe and an amount of the measurement light that the optical receiver needs to receive for analysis of the measurement light.

2. The gas analyzer of claim 1, wherein the aligner expands the beam diameter of the measurement light to be greater than a width of the reflector in a direction substantially orthogonal to an optical axis of the measurement light.

3. The gas analyzer of claim 1, wherein the aligner comprises an optical lens disposed between the optical emitter and the measurement region and that condenses the measurement light.

4. The gas analyzer of claim 3,
wherein the optical lens is a plano-convex lens,
wherein a flat surface of the plano-convex lens faces the optical emitter, and
wherein a convex surface of the plano-convex lens faces the measurement region.

5. The gas analyzer of claim 3, wherein the aligner further comprises an alignment mechanism that changes a distance between the optical lens and the optical emitter along an optical axis of the measurement light.

6. The gas analyzer of claim 5,
wherein the alignment mechanism comprises an alignment screw rotatably supported about an axis substantially parallel to the optical axis by a fastener that fixes the optical lens, and
wherein one end of the alignment screw is in contact with the optical emitter, and another end of the alignment screw is exposed from the fastener at an opposite side from the optical emitter.

* * * * *